United States Patent [19]

Kemper et al.

[11] Patent Number: 4,755,549

[45] Date of Patent: Jul. 5, 1988

[54] STABILIZED MOLDING COMPOUNDS BASED ON POLYVINYL CHLORIDE OR VINYL CHLORIDE COPOLYMERS AND STABILIZER SYSTEM

[75] Inventors: Bruno Kemper, Haltern; Heimo Bieringer, St. Georgen, both of Fed. Rep. of Germany

[73] Assignee: Huels Aktiengesellschaft, Marl, Fed. Rep. of Germany

[21] Appl. No.: 74,183

[22] Filed: Jul. 16, 1987

[30] Foreign Application Priority Data

Jul. 17, 1986 [DE] Fed. Rep. of Germany ....... 3624079

[51] Int. Cl.$^4$ .......................... C08K 5/36; C08K 5/20
[52] U.S. Cl. ................. 524/226; 252/400.52; 524/227; 524/301; 524/392; 524/567
[58] Field of Search ............... 524/226, 227, 567, 392, 524/301; 528/423; 525/417; 252/400.52

[56] References Cited

U.S. PATENT DOCUMENTS

| | | | |
|---|---|---|---|
| 3,004,949 | 10/1961 | Chevassus | 524/93 |
| 3,470,267 | 9/1969 | Litt et al. | 525/417 |
| 3,483,141 | 12/1969 | Litt et al. | 528/423 |
| 4,436,789 | 3/1984 | Davis et al. | 524/433 |
| 4,515,916 | 5/1985 | Molt | 524/433 |

*Primary Examiner*—Veronica P. Hoke

*Attorney, Agent, or Firm*—Millen & White

[57] ABSTRACT

A stabilizer system for stabilizing polyvinyl chloride molding compositions contains at least one zinc compound of the formulas $$R^1O-Zn-OR^2 \quad (I)$$

$$R^3S-Zn-SR^4 \quad (II), or$$

$$R^5O-Zn-SR^6 \quad (III)$$

and one or more polyoxazolines or copolyoxazoline of the formula

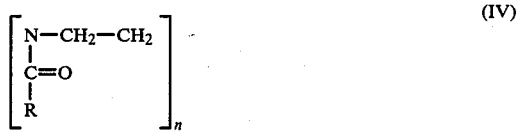

(IV)

wherein $R^1$, $R^2$, $R^3$, $R^4$, $R^5$, $R^6$, and n are described herein. The stabilized molding compositions exhibit a good initial color, transparency and long-term stability.

17 Claims, No Drawings

STABILIZED MOLDING COMPOUNDS BASED ON POLYVINYL CHLORIDE OR VINYL CHLORIDE COPOLYMERS AND STABILIZER SYSTEM

BACKGROUND OF THE INVENTION

As is well known, chlorine-containing polymers, especially polyvinyl chloride, suffer degradation from the effects of heat, for example during processing, which causes discolorations and an impairment of the mechanical properties. Therefore, stabilizers must be added to such polymers before processing. Essentially organotin compounds, organic and inorganic lead salts, organic antimony compounds or combinations of cadmium and barium carboxylates or of zinc and calcium carboxylates are used as stabilizers for polyvinyl chloride. Costabilizers are often added to these so-called primary stabilizers to improve their effectiveness. The mode of operation of primary or costabilizers, or their interaction (synergism) is described in the relevant literature, for example in the publication of L.I. Nass, "Heat Stabilizers" in Kirk Othmer, Encyclopedia of Chemical Technology, Vol. 12, 3rd Edition, page 225, John Wiley and Sons, 1980.

The effectiveness of the described stabilizers is sufficient for most applications; however, their use is subject to some important limitations. Due to their toxicity, lead, antimony, and cadmium stabilizers cannot be used in all fields, especially not in packaging materials for foodstuffs or in the medical field. Organotin compounds, some of which are toxically safe, are not suitable for a broad range of applications since they are relatively expensive and not readily available.

On the other hand, only an insufficient stabilization can be achieved with a physiologically unobjectionable stabilizer combination consisting of zinc and calcium carboxylates, as they are described in U.S. Pat. No. 2,446,976 (see Table A, Example 2, below).

For this reason, costabilizers such as epoxy compounds, polyols, organic phosphites, substituted dihydropyridines, 1,3-diketones or combinations of these compounds are added to zinc and calcium carboxylates. All these stabilizer combinations are, however, still not sufficiently effective, since the long-term stability of molding compositions stabilized this way proves unsatisfactory and/or the initial color is mediocre or bad. Especially both the initial color and the transparency of polymer compounds are greatly impaired by the high calcium carboxylate content required for long-term stability.

SUMMARY OF THE INVENTION

An object of this invention is to provide a stabilizer system for use in molding compositions which imparts long term stability to molding compositions and which does not impair initial color or transparency.

Another object of this invention is to provide a stabilizer system for molding compositions which are physiologically tolerable and which provide effective stabilization.

A further object of the invention is to provide stabilized molding compositions which possess long term stability as well as satisfactory initial color and transparency.

Upon further study of the specification and appended claims, further objects and advantages of this invention will become apparent to those skilled in the art.

These objects are obtained by providing a stabilizer system for stabilizing molding compounds, based on polyvinyl chloride or vinyl chloride copolymers, comprising at least one zinc compound and at least one costabilizer, wherein the at least one zinc compound is one or more compounds of the formulas

$$R^1O\text{—}Zn\text{—}OR^2, \qquad (I)$$

$$R^3S\text{—}Zn\text{—}SR^4, \text{ and/or} \qquad (II)$$

$$R^5O\text{—}Zn\text{—}SR^6, \qquad (III)$$

wherein:

$R^1$ and $R^2$, being the same or different, are straight-chain or branched aliphatic acyl groups having 8 to 36, preferably 8 to 22 C atoms, optionally substituted with hydroxyl groups; or aroyl groups having 7 to 11 C atoms, optionally substituted with alkyl groups of 1 to 22 C atoms; or aryl groups having 6 to 10 atoms, optionally substituted with alkyl groups of 1 to 22 C atoms;

$R^3$ and $R^4$, being the same or different, are straight-chain or branched alkyl groups having 6 to 22 C atoms; or aryl groups having 6 to 10 atoms, optionally substituted with alkyl groups of 1 to 22 C atoms; or a grouping —X—CO—O—Y;

X is an alkylene group $(CH_2)_m$ with m=1 to 20, or a phenylene group, or grouping —CHZ—;

Z is a straight-chain or branched alkyl group having 1 to 22 C atoms, or a grouping —CH$_2$—CO—O—Y;

Y stands for a straight-chain or branched alkyl group having 6 to 22 C atoms;

$R^5$ is one of the group defined for $R^1$ or $R^2$; and $R^6$ is one of the group defined for $R^3$ or $R^4$; and the costabilizer is one or more polyoxazolines or copolyoxazolines of the formula

$$\begin{bmatrix} N\text{—}CH_2\text{—}CH_2 \\ | \\ C=O \\ | \\ R \end{bmatrix}_n \qquad (IV)$$

wherein n is a whole number from 10 to 10,000; and

R means identical or different groups which are straight-chain or branched alkyl radicals having 1 to 22 C atoms or cycloalkyl radicals having 4 to 7 atoms, optionally substituted with alkyl groups of 1 to 22 C atoms or aryl radicals having 6 to 10 C atoms, optically substituted.

R preferably represents alkyl radicals having 1 to 12 C atoms.

Throughout the foregoing the following definitions are suitable. Suitable aliphatic acyl groups are alkanoyl or alkenoyl groups. Suitable aroyl or aromatic acyl groups are of 7–11 C-atoms, e.g., benzoyl and 1—or 2—naphthoyl. Suitable aryl groups are of 6–10 C-atoms, e.g., phenyl and 1- or 2- naphthyl. Suitable cycloalkyl groups are of 4–7 C atoms, e.g., cyclobutyl, cyclopentyl, cyclohexyl, cycloheptyl, etc. In all cases, suitable alkyl groups and alkyl portions (all of which can be straight-chained or branched) are, as appropriate, methyl, ethyl, n-propyl, iso-propyl, n-, sec-, iso- or tertbutyl, or a pentyl, a hexyl, a heptyl, an octyl, a nonyl, a decyl, an undecyl, a dodecyl, a tridecyl, a tetradecyl, a pentadecyl, a hexadecyl, a heptyldecyl, an octadecyl, etc.

Typically the number of OH substituents is 1-2. The number of alkyl substituents on the various groups is 1-2, the total number of C atoms in all of such substituents on a given group being 1-32. The total number of C atoms in a given group with substituents is preferably not greater than about 22. Typical substituents on the R cycloalkyl and aryl groups include $C_{1-22}$-alkyls in accordance with the foregoing.

n is preferably 20-1000

The stabilizer system preferably contains the zinc compounds and the polyoxazoline or copolyoxazolines in a weight ratio of each other of about 1:10 to 10:1, particularly in a weight ratio of about 1:5 to 5:1.

The objects of the invention are also achieved by a stabilized molding compositions, based on polyvinyl chloride or vinyl chloride copolymers, containing the stabilizer system according to the invention.

The stabilized molding compositions contain the compounds of formula I and/or II and/or III suitably together in amounts of about 0.02 to 2.0, especially about 0.05 to 1.0% by weight, relative to the weight of the polymers.

The stabilized molding compositions, also contain the compounds of formula IV suitably in amounts of about 0.02 to 2.0, especially about 0.05 to 1.0% by weight, relative to the weight of the polymers.

Stabilized molding compositions which are particularly suitable are those which contain conventional primary stabilizers in the form of tin, lead or antimony compounds or in the form of combinations of cadmium, barium, calcium and zinc compounds and which also contain, as an additive, a mixture of the compounds of formula I and/or II and/or III and the compounds of formula IV.

Such known primary stabilizers and or primary stabilizer systems are, for example, described in the Gaechter-Mueller monograph "Plastics Additives," Hanser Verlag, 2nd edition 1983, page 199 ff, which disclosure is incorporated by reference herein.

Stabilized molding compositions which contain one or more polyoxazolines of formula IV, in which R is a methyl, ethyl, or isopropyl group, and/or one or more copolyoxazolines of formula IV in which R is methyl and/or ethyl and/or isopropyl, are preferred.

In a preferred embodiment the stabilized molding compositions contain—in addition to at least one zinc compound of formulas I, II or III, and at least one polyoxazoline or copolyoxazoline of formula IV—optionally plasticizers and costabilizers such as epoxy compounds, phosphites, polyols or 1,3-diketones, as well as the usual processing aids.

The stabilizer system according to the invention, comprising at least one zinc compound of formulas I, II or III and at least one polyoxazoline or copolyoxazoline of formula IV, can also be used as an additive to molding compositions which are stabilized with tin, lead or antimony compounds or with combinations of cadmium, barium, calcium and zinc compounds. Through this additive, the initial color and long-term stability of the molding compounds are markedly improved. The preferred weight ratio of primary stabilizer to the stahilizer system of the invention is about 1:5 to 5:1. The total amount of the stabilizer system is about 0.5 to 5.0% by weight relative to the weight of polymers.

The stabilized molding compositions according to the invention exhibit, under thermal stress, excellent initial color and transparency while simultaneously possessing good duration of overall stability. Especially with regard to the initial color, the stabilizer systems according to the invention are markedly superior to standard stabilizer systems based on zinc and calcium carboxylates, as well as stabilizer systems made of zinc mercaptoesters and calcium salts such as described in EP-PS No. 0 070 092 of Jan. 19, 1983 (see Table A, example 6, below).

The stabilized molding compositions based on vinyl chloride polymers according to the invention thus contain, as stabilizers, a combination of carboxylates, phenolates or mercaptides of zinc and homopolymers or copolymers of aryl or alkyl oxazolines. It was shown that the named polyoxazolines improve the long-term stability obtainable through the use of zinc stabilizers to an unpredictable extent without impairing the initial color and transparency (see Table A).

The vinyl chloride polymers, which form the base of the molding compositions according to the invention, include polyvinyl chloride or copolymers of vinyl chloride, which can be produced by known methods, as described for example in the monograph of Kainer, Polyvinyl Chloride and Vinyl Chloride-Copolymers (1965), Springer Verlag, on pages 7 to 59 (mass, suspension, or emulsion polymerization) (herein incorporated by reference). The copolymers can contain up to about 30% by weight comonomers such as, for example, vinyl acetate, vinylidene chloride, vinyl ether, acrylonitrile, acrylic acid ester, maleic acid monoester or diester or olefins. Graft polymers can also be used whose production, for example, is described in the above-cited Kainer's monograph on pages 111 to 114 (also herein incorporated by reference).

The compounds of formulas I, II and III are known and can be produced by current methods of organic synthesis. Compounds of formulas I, II and III can be produced in this manner from zinc oxide or zinc salts, for example zinc chloride, and carboxylic acids, thiocarboxylic acids or mercaptans, as described, for example, in Houben-Weyl, Methods of Organic Chemistry, Volume 9 (1955), pages 43 to 45 (herein incorporated by reference).

The compounds of formula IV are also known and can be produced by polymerization and copolymerization of 2-alkyl- or 2-aryl-oxazolines. This process is described, for example, in T. Saegusa and S. Kobayashi, Encyclopedia of Polymer Science and Technology, Suppl. Vol. 1, Wiley, New York, 1976, page 220 (herein incorporated by reference). Compounds of Formula IV, wherein R is a aryl radical, can be produced by condensation of a benzoic acid with aminoethanol and polymerization of the resulting 2-aryl-oxazoline.

The compounds corresponding to formulas I, II and III can be homogeneous or mixed zinc salts derived from fatty acids with 8 to 36, preferably 8 to 22 carbon atoms and from mercaptans with 6 to 22 carbon atoms, which optionally contain one or more atom groupings

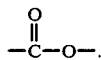

The following are especially suitable as fatty acids: capric acid, caprylic acid, lauric acid, myristic acid, palmitic acid, stearic acid and behenic acid. Likewise usable are salts of branched fatty acids such as 2-ethyl hexanoic acid, 2-octyl decanoic acid or also hydroxy fatty acids such as 9(10)-hydroxy stearic acid or 9,10-dihydroxy stearic acid. The zinc compound can consist of the salt of a single fatty acid or also of the salts of fatty acid mixtures, as they are obtained from natural fats.

As salts of aromatic carboxylic acids, the zinc salts of benzoic acid and substituted benzoic acids, especially of the alkyl-substituted benzoic acids, are suitable. The following can be used, for example, as phenolates: methyl phenolates, t-butyl phenolates, nonyl phenolates, dodecyl phenolates or naphthenates of zinc.

As mercaptides, the zinc salts of hexyl mercaptan, octyl mercaptan, nonyl mercaptan, decyl mercaptan, dodecyl mercaptan, palmityl mercaptan, stearyl mercaptan and behenyl mercaptan, or also of branched mercaptans such as 2-ethyl hexyl mercaptan, 2-ethyl nonyl mercaptan, 2-octyl decyl mercaptan or 1,1-dimethyl decyl mercaptan are suitable, for example.

Zinc salts of aromatic mercaptans can also be used, such as, for example, thiophenol, t-butyl thiophenol, nonyl thiophenol, dodecyl thiophenol or thionaphthol. Preferably, the zinc salts of mercaptans containing carboxyl groups are used, such as butyl ester, hexyl ester, octyl ester, 2-ethyl hexyl ester, 2-ethyl nonyl ester, palmityl ester or stearyl ester of thioglycolic acid, 2-mercaptopropionic acid, 3-mercaptopropionic acid or thiosalicylic acid. Zinc mercaptides of mercaptans with several carboxyl groups, such as, for example, the above mentioned esters of 2-mercaptosuccinic acid, are also suitable.

Compounds of formula IV (polyoxazolines) are preferably used as chelating agents. Compounds of formula IV are, for example, polymethyl oxazoline, polyethyl oxazoline, poly-n-propyloxazoline, polyisopropyloxazoline, polyundecyl oxazoline or polyphenyl oxazoline. Copolymers of two different alkyl or aryl oxazolines in portions between 5 and 95% respectively can also be used. Terpolymers with three different oxazolines in portions between 5 and 95 % respectively can also be used. Preferred are copolymers of methyl and n-propyl oxazoline methyl and isopropyl oxazoline, methyl and undecyl oxazoline ethyl and methyl oxazoline, ethyl and undecyl oxazoline, ethyl and n-propyl oxazoline, and ethyl and isopropyl oxazoline. A preferred terpolymer contains methyl, isopropyl, and undecyloxazoline.

Generally, stabilized molding compositions contain, for 100 parts by weight polymer, about 0.02 to 2, preferably about 0.05 to 1.0 parts by weight of the compounds of formula I and/or II and/or III. These compounds are combined with about 0.02 to 2, preferably about 0.05 to 1.0 parts by weight of the compounds in formula IV.

The stabilized molding compositions according to the invention can be produced by standard methods, for example through simple mechanical mixing of the components in conventional mixers. The uniform distribution of stabilizers in PVC can be accomplished, for example, using a double drum mixer at 150° to 200° C.

The mixing process can incorporate further standard processing aids such as, for example, lubricants (montan waxes or polyol partial esters or fatty acid amides), plasticizers, fillers, light stabilizers or other costabilizers, such as epoxidized fatty acid esters, polyols, phosphites, 1,3-diketones or dihydropyridine dicarboxylic acid esters.

The total amount of plasticizers and fillers is about 0 to 100 parts by weight, relative to 100 parts by weight oF polymer, respectively. Costabilizers can be used in a range of about 0.05 to 10.0 parts by weight, relative to 100 parts by weight of polymer respectively.

Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degree Celsius and unless otherwise indicated, all parts and percentages are by weight.

The entire text of all applications, patents and publications cited above and below are hereby incorporated by reference.

EXAMPLES

Production and Testing of the Rolled Sheet

The effect of stabilizer systems was tested by determining the static thermostability of rolled sheets. For this purpose, the stabilizer systems and optionally plasticizers and processing aids were mixed with polyvinyl chloride for 1 minute in a laboratory mill and then processed on a double roll mill at a roll temperature of 170° C. at an even speed for 5 minutes into 1 mm thick rolled sheets. Strips measuring 10 by 250 mm were cut from the rolled sheets and then subjected to thermal stress in a thermotest oven (Sigma-type Metrastat) according to DIN 53 381 at 180° C. During this process the test strips are continuously taken out of the heating zone and exhibit the effect of the stabilizers in the color changes. The following were used as stabilizer components:

1. zinc stearate
2. zinc octoate
3. zinc-bis-(2-ethyl hexyl thioglycolate)
4. POX I: copolymer with 30 mol % of methyl and 70 mol % of isopropyl oxazoline
5. POX II: polyethyl oxazoline
6. calcium stearate
7. TNPP: tris(nonylphenyl)phosphite
8. ESO: epoxidized soybean oil
9. benzoyl stearoyl methane
10. trimethylolpropane
11. calcium behenate Mixture A was made of the following components ("PW" means parts by weight):
— 100 PW suspension polyvinyl chloride (K-value 70; VESTOLIT ®S 7054; Huels AG, Marl)
— 30 PW dioctyl phthalate (VESTINOL ®AH; Huels AG, Marl)
— 0.3 PW montan wax To produce polyvinyl chloride molding compositions 1 to 8, mixture A of the indicated composition was mixed with the stabilizers of Table A. The mixtures were process in the described way into test strips and tested in the thermotest oven. The respective progress of discoloration of the test strips during thermal stress is assessed according to the following scale:

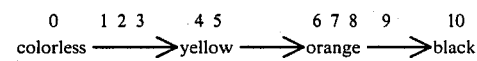

TABLE A

| Example No. | Stabilizer(s) | PW | 0 | 10 | 20 | 30 | 40 | 50 |
|---|---|---|---|---|---|---|---|---|
| | | | | | Color | | | |
| 1 comp. | zinc stearate | 0.2 | 0 | 10 | 10 | 10 | 10 | 10 |
| 2 comp. | zinc stearate | 0.5 | 2 | 3 | 3 | 7 | 10 | 10 |
| | calcium stearate | 1.0 | | | | | | |
| 3 inv. | zinc stearate | 0.2 | 0 | 0 | 3 | 7 | 7 | 7 |
| | POX I | 0.2 | | | | | | |
| 4 inv. | zinc stearate | 0.2 | 0 | 0 | 0 | 3 | 7 | 7 |
| | POX I | 0.2 | | | | | | |
| | TNPP | 0.1 | | | | | | |
| 5 comp. | zinc-bis(2-ethyl-hexyl thioglycolate) | 0.2 | 0 | 0 | 10 | 10 | 10 | 10 |
| 6 comp. | zinc-bis(2-ethyl-hexyl thioglycolate) | 0.3 | 1 | 1 | 1 | 2 | 5 | 10 |
| | calcium stearate | 0.5 | | | | | | |
| 7 inv. | zinc-bis(2-ethyl-hexyl thioglycolate) | 0.2 | 0 | 0 | 0 | 0 | 5 | 7 |
| | POX I | 0.2 | | | | | | |
| 8 inv. | zinc-bis(2-ethyl-hexyl thioglycolate) | 0.6 | 0 | 0 | 0 | 1 | 3 | 3 |
| | POX I | 0.6 | | | | | | |

Stress at 180° C. in Minutes comp. = for comparison; inv. = according to the invention A mixture B was made of the following components:
—100 PW of suspension polyvinyl chloride (K-value 70; VESTOLIT®S 7054; Huels AG, Marl)
—1.0 PW of stearic acid.

To produce polyvinyl chloride molding compositions 9 to 11, mixture B of the indicated composition was mixed with the stabilizers in Table B and processed in the indicated way into test strips.

TABLE B

| Example No: | Stabilizer(s) | PW | 0 | 10 | 20 | 30 | 40 | 50 |
|---|---|---|---|---|---|---|---|---|
| | | | | | Color | | | |
| 9 comp. | zinc stearate | 0.5 | 6 | 6 | 6 | 6 | 6 | 10 |
| | calcium stearate | 1.0 | | | | | | |
| 10 inv. | zinc stearate | 0.2 | 2 | 2 | 2 | 8 | 9 | 10 |
| | POX I | 0.2 | | | | | | |
| 11 inv. | zinc-bis(2-ethyl-hexyl thioglycolate) | 0.1 | 0 | 0 | 0 | 1 | 2 | 3 |
| | POX I | 0.1 | | | | | | |

Stress at 180° C. in Minutes

A mixture C was made from the following components:
—100 PW of suspension-polyvinyl chloride (K-value 60; VESTOLIT®S 6058; Huels AG, Marl)
—10 PW of stearic acid To produce polyvinyl chloride molding compositions 2 to 18, mixture C with the indicated composition was mixed with the stabilizers of Table C and processed in the indicated way into test strips.

TABLE C

| Example No: | Stabilizers | PW | 0 | 10 | 20 | 30 | 40 | 50 | 60 |
|---|---|---|---|---|---|---|---|---|---|
| | | | | | | Color | | | |
| 12 inv. | zinc-bis(2-ethyl hexyl thioglycolate) | 0.2 | 0 | 0 | 0 | 0 | 10 | 10 | 10 |
| | POX I | 0.1 | | | | | | | |
| 13 inv. | zinc-bis(2-ethyl hexyl thioglycolate) | 0.1 | | | | | | | |
| | POX I | 0.1 | 1 | 1 | 1 | 2 | 3 | 4 | 10 |
| | ESO | 3.0 | | | | | | | |
| 14 inv. | zinc-bis(2-ethyl hexyl thioglycolate) | 0.1 | 1 | 1 | 1 | 1 | 4 | 4 | 5 |
| | POX I | 0.1 | | | | | | | |
| 15 inv. | Zinc-bis(2-ethyl hexyl thioglycolate) | 0.1 | | | | | | | |
| | POX I | 0.1 | 0 | 0 | 0 | 0 | 0 | 1 | 3 |
| | ESO | 5.0 | | | | | | | |
| 16 inv. | zinc-bis(2-ethyl hexyl thioglycolate) | 0.5 | | | | | | | |
| | POX I | 0.3 | 1 | 1 | 1 | 1 | 3 | 3 | 10 |
| | calcium stearate | 0.3 | | | | | | | |
| 17 inv. | zinc stearate | 0.2 | 1 | 1 | 2 | 2 | 2 | 7 | 8 |
| | POX I | 0.2 | | | | | | | |
| 18 inv. | zinc stearate | 0.2 | | | | | | | |
| | POX I | 0.2 | 1 | 1 | 1 | 1 | 1 | 3 | 3 |
| | ESO | 3.0 | | | | | | | |
| 19 comp. | zinc stearate | 0.2 | 4 | 4 | 4 | 5 | 6 | 8 | 10 |
| | calcium stearate | 0.4 | | | | | | | |

Stress at 180° C. in Minutes

To produce polyvinyl chloride molding compositions 19 to 25, 100 PW of mass PVC (K-value 58; VESTOLIT® N 5867; Huels AG, Marl) was mixed with the stabilizers in Table D and processed in the indicated way into test strips.

TABLE D

| Example No: | Stabilizers | PW | 0 | 10 | 20 | 30 | 40 | 50 | 60 |
|---|---|---|---|---|---|---|---|---|---|
| | | | | | | Color | | | |
| 19 comp. | zinc octoate | 0.075 | | | | | | | |
| | calcium behenate | 0.35 | 3 | 3 | 3 | 3 | 4 | 4 | 4 |
| | ESO | 5.0 | | | | | | | |
| 20 inv. | zinc octoate | 0.074 | | | | | | | |
| | POX II | 0.1 | 1 | 1 | 1 | 1 | 1 | 4 | 4 |
| | ESO | 5.0 | | | | | | | |
| 21 inv. | zinc stearate | 0.1 | | | | | | | |
| | POX II | 0.04 | 1 | 1 | 1 | 1 | 1 | 1 | 4 |
| | ESO | 5.0 | | | | | | | |
| 22 inv. | zinc stearate | 0.1 | | | | | | | |
| | POX II | 0.04 | 0 | 0 | 0 | 0 | 2 | 3 | 4 |
| | ESO | 5.0 | | | | | | | |
| | benzoyl stearoyl methane | 0.1 | | | | | | | |
| 23 inv. | zinc stearate | 0.1 | | | | | | | |
| | POX II | 0.04 | | | | | | | |
| | ESO | 5.0 | 0 | 0 | 0 | 0 | 1 | 3 | 4 |
| | trimethylol propane | 0.2 | | | | | | | |
| 24 comp. | zinc stearate | 0.2 | 3 | 3 | 3 | 10 | 10 | 10 | 10 |
| | calcium stearate | 0.4 | | | | | | | |
| 25 inv. | zinc stearate | 0.2 | 1 | 1 | 1 | 1 | 7 | 10 | 10 |
| | POX II | 0.2 | | | | | | | |

Stress at 180° C. in Minutes

A mixture E was made of the following components:
—100 PW of suspension polyvinyl chloride (K-value 70; VESTOLIT® S 7054; Huels AG, Marl)
—30 PW of dioctyl phthalate (VESTINOL® AH; Huels AG, Marl)

—0.3 PW of zinc stearate
—0.6 PW of barium stearate

To produce polyvinyl chloride molding compositions 26 to 29, mixture E with the indicated composition was mixed with the stabilizers in Table E and process in the indicated way into test strips.

TABLE E

| Example No: | Stabilizers | PW | \_Stress at 180° C. in Minutes\_ | | | | | | |
|---|---|---|---|---|---|---|---|---|---|
| | | | 0 | 10 | 20 | 30 | 40 | 50 | 60 |
| | | | | | | Color | | | |
| 26 comp. | — | | 3 | 3 | 3 | 2 | 2 | 8 | 10 |
| 27 comp. | zinc stearate | 0.1 | 1 | 1 | 1 | 1 | 1 | 10 | 10 |
| 28 inv. | zinc stearate | 0.1 | 1 | 1 | 1 | 1 | 1 | 4 | 10 |
| | POX II | 0.07 | | | | | | | |
| 29 inv. | zinc stearate | 0.2 | 1 | 1 | 1 | 1 | 1 | 3 | 7 |
| | POX II | 0.2 | | | | | | | |

The preceding examples can be repeated with similar success by substituting the generically or specifically described reactants and/or operating conditions of this invention for those use in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a stabilized molding composition comprising polyvinyl chloride or a vinyl chloride copolymer and a stabilizer system, the improvement wherein the stabilizer system comprises at least one zinc compound and at least one costabilizer, said zinc compound being one or more compounds of the formulas

  (I)

  (II)

  (III)

wherein
   $R^1$, $R^2$ and $R^5$, being the same or different, are straight-chain or branched aliphatic acyl groups having 8 to 36 C atoms, optionally substituted with hydroxyl groups, or aroyl groups having 7 to 11 C atoms, optionally substituted with alkyl groups of 1 to 22 C atoms, or aryl groups having 6 to 10 C atoms, optionally substituted with alkyl groups of 1 to 22 C atoms;
   $R^3$, $R^4$ and $R^6$, being the same or different, are straight-chain or branched alkyl groups having 6 to 22 C atoms, or aryl groups having 6 to 10 C atoms, optionally substituted with alkyl groups of 1 to 22 C atoms, or a grouping —X—CO—O—Y;
   X is an alkylene group $(CH_2)_m$ in which m=1 to 20, or a phenylene group, or a grouping —CHZ—;
   Z is a straight-chain or branched alkyl group having 1 to 22 C atoms, or a grouping —CH$_2$—CO—O—Y;
   Y is a straight-chain or branched alkyl group having 6 to 22 C atoms;
and said costabilizer is one or more polyoxazolines or copolyoxazolines of the formula

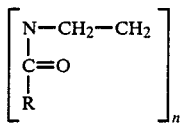  (IV)

wherein
   n is a whole number from 10 to 10,000; and
   R means identical or different groups which are straight-chain or branched alkyl radicals having 1 to 22 C atoms, or cycloalkyl radicals having 4 to 7 C atoms, or aryl radicals having 6 to 10 C atoms said stabilizer system being present in a thermal stabilizing amount.

2. A stabilized molding composition according to claim 1, wherein R means, identical or different, alkyl radicals having 1 to 12 C atoms.

3. A stabilized molding composition according to claim 1, wherein the content of said zinc compound is about 0.02 and 2.0% by weight, relative to the weight of said polymer.

4. A stabilized molding composition according to claim 1, wherein the content of said costabilizer is about 0.02 and 2.0% by weight, relative to the weight of said polymer.

5. A stabilized molding composition according to claim 3, wherein the content of said costabilizer is about 0.02 and 2.0% by weight, relative to the weight of said polymer.

6. A stabilized molding composition according to claim 1, further comprising as a primary stabilizer a tin, lead or antimony compound, or a combination of cadmium, barium, calcium and zinc compounds.

7. A stabilized molding composition according to claim 1, wherein said zinc compound is zinc stearate and said costabilizer is a polyoxazoline comprising about 30 mol % of methyl oxazoline and about 70 mol % isopropyl oxazoline.

8. A stabilized molding composition according to claim 1, wherein said zinc compound is zinc-bis(2-ethyl hexyl thioglycolate) and said costabilizer is a polyoxazoline comprising about 30 mol % methyl oxazoline and about 70 mol % isopropyl oxazoline.

9. A stabilized molding composition according to claim 1, wherein said zinc compound is zinc octoate and said costabilizer is polyethyl oxazoline.

10. A stabilized molding composition according to claim 1, wherein said zinc compound is zinc stearate and said costabilizer is polyethyl oxazoline.

11. A stabilizer system useful for stabilizing a molding compound based on polyvinyl chloride or a vinyl chloride copolymer, comprising at least one zinc compound of the formula,

  (I)

  (II)

  (III)

wherein
   $R^1$, $R^2$ and $R^5$, being the same or different, are straight-chain or branched, aliphatic acyl groups having 8 to 36 C atoms, optionally substituted with hydroxyl groups, or aroyl groups having 7 to 11 C atoms, optionally substituted with alkyl groups of 1 to 22 C atoms, or aryl groups having 6 to 10 C atoms; optionally substituted with alkyl groups of 1 to 22 C atoms, R³, R⁴ and R⁶, being the same or different, are straight-chain or branched alkyl groups having 6 to 22 C atoms, or aryl groups having 6 to 10 C atoms optionally substituted with alkyl groups of 1 to 22 C atoms, or a grouping —X—C—O—Y;

X is an alkylene group (CH₂)$_m$ in which m=1 to 20, or a phenylene group, or a grouping —CHZ—;

Z is a straight-chain or branched alkyl group having 1 to 22 C atoms, or a grouping —CH₂—CO—O—Y; and Y is a straight-chain or branched alkyl group having 6 to 22 C atoms;

and a costabilizer of the formula

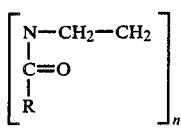

(IV)

wherein n represents whole numbers from 10 to 10,000;

R means identical or different groups which are straight-chain or branched alkyl radicals having 1 to 22 C atoms, or cycloalkyl radicals having 4 to 7 C atoms, or aryl radicals having 6 to 10 C atoms said zinc compound and said costabilizer are in a weight ratio of 1:10 to 10:1.

12. A stabilizer system according to claim 11, wherein R means, identical or different, alkyl radicals having 1 to 12 C atoms.

13. A stabilizer system according to claim 11, wherein said zinc compound and said costabilizer are in a weight ratio of about 1:5 to 5:1.

14. A stabilizer system according to claim 11, wherein said zinc compound is zinc stearate and said costabilizer is a polyoxazoline comprising about 30 mol % of methyl oxazoline and about 70 mol % isopropyl oxazoline.

15. A stabilizer system according to claim 11, wherein said zinc compound is zinc-bis(2-ethyl hexyl thioglycolate) and said costabilizer is a polyoxazoline comprising about 30 mol % methyl oxazoline and about 70 mol % isopropyl oxazoline.

16. A stabilizer system according to claim 11, wherein said zinc compound is zinc octoate and said costabilizer is polyethyl oxazoline.

17. A stabilizer system according to claim 11, wherein said zinc compound is zinc stearate and said costabilizer is polyethyl oxazoline.

* * * * *